United States Patent Office 2,967,057
Patented Jan. 3, 1961

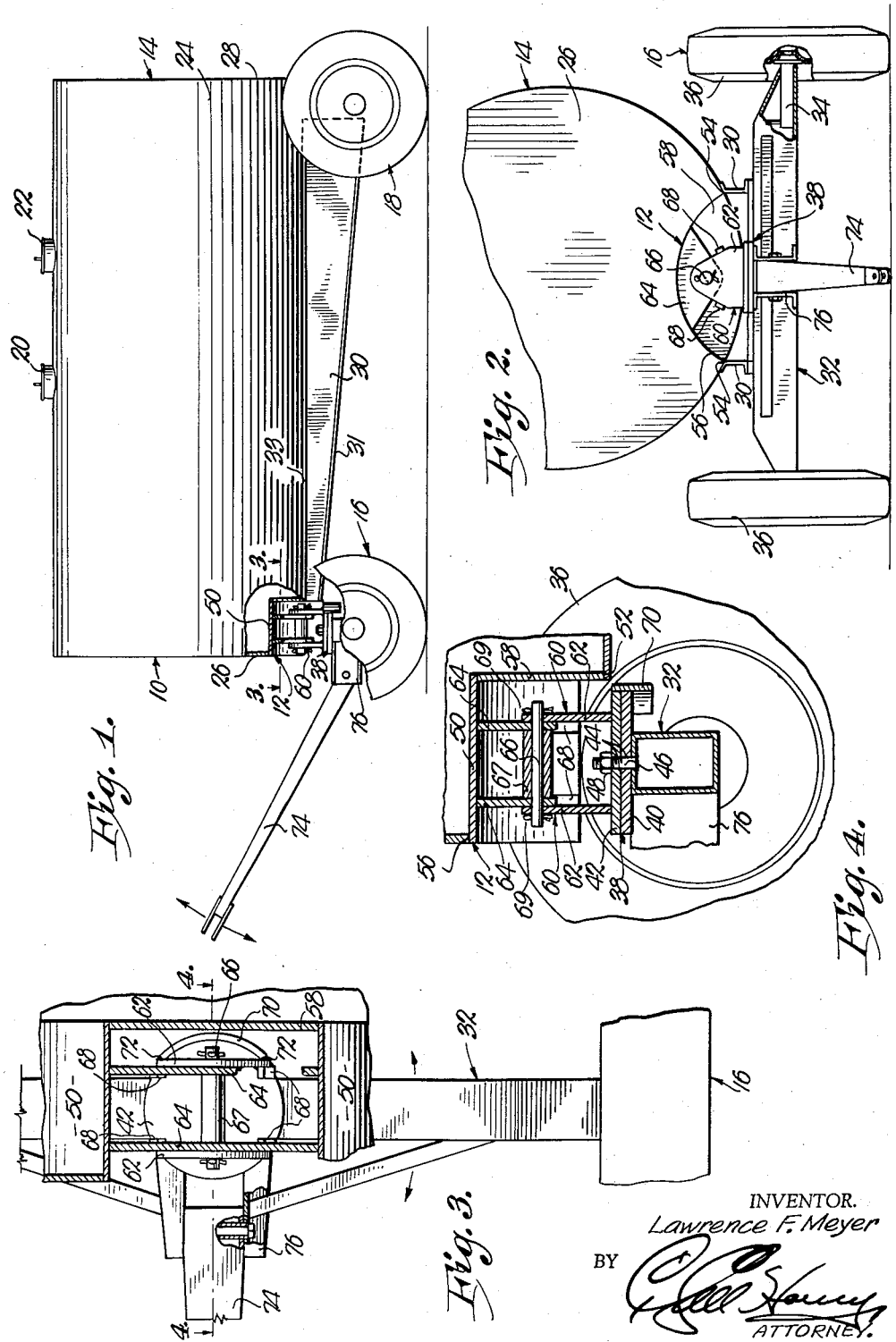

2,967,057

FIFTH WHEEL MOUNTING STRUCTURE FOR MOBILE TANK UNITS

Lawrence F. Meyer, Kansas City, Kans., assignor to Homer G. Abbott, Bonner Springs, Kans.

Filed Oct. 21, 1958, Ser. No. 768,766

5 Claims. (Cl. 280—5)

This invention relates broadly to the field of mobile tank units and more particularly, to trailer tanks adapted to be pulled behind suitable tractor or truck means and having a much lower center of gravity than previously provided tank units of this character.

In recent years, a rapidly expanding market has developed for mobile tank units which are adapted to be utilized by contractors and similar persons at the site of construction and which tank units are adapted to contain various types of fuels such as gasoline, Diesel fuel and similar compositions to thereby provide a ready supply of the fuel for vehicles being operated at the construction area. It can be understood that many times it is inconvenient to drive such vehicles to a normal commercial source of fuel and very often this is impossible because of the nature of the machine itself, inasmuch as very heavy equipment cannot be driven over many types of road surfaces. Many fuel supply companies are currently meeting the demand for fuel at the site of construction by providing mobile tank units of approximately 500 or 1000 gallons capacity and which the contractor may utilize to transport the fuel to any desired point.

However, a problem has arisen in the provision of mobile tank units which are suitable for utilization in all types of terrain, regardless of the irregularity of the ground over which the trailer tank is pulled. It was determined that the principal cause of the tank units overturning in rough terrain was the relatively high center of gravity of the tank itself, but attempts to lower the fuel tank were forestalled by virtue of the necessity of providing structure between one of the wheel and axle assemblies of the tank units and the tank itself to permit the trailer to be steered and also compensate for the irregular surface characteristics of the ground.

It is, therefore, the most important object of the instant invention to provide novel mounting structure on the tank permitting the center of gravity of such tank to be substantially lowered without interfering with operation of a fifth wheel unit mounted on one of the wheel and axle assemblies or parts carried by the fifth wheel unit permitting such axle to rock about a horizontal axis intersecting the vertical axis of rotation of the fifth wheel unit.

Also an important object of this invention is to provide improved fifth wheel and irregular surface compensation components mounted on one of the wheel and axle assemblies supporting the tank, wherein the mounting structure includes a substantially uniformly arcuate plate joined to the sides of the tank and recessed within the interior of the same to thereby materially lower the center of gravity of the fuel tank by virtue of securing the irregular surface compensation components referred to above to the innermost exterior surface area of the plate recessed within the tank.

Also an object of the invention is to provide a semi-cylindrical mounting plate as referred to above wherein one arcuate edge of the plate is joined to an end wall of the tank, while a novel plate member interconnects the opposite arcuate edge of the mounting plate with the side wall of the fuel tank to thereby increase the structural strength characteristics of the specified mounting plate.

Other important objects of this invention relate to the provision of improved fifth wheel mounting structure for mobile tank units including an arcuate plate recessed within the tank as described, and novel irregular surface compensation components carried by the fifth wheel unit and having the uppermost parts thereof secured to the concave surface of the mounting plate within the recess provided by such plate, and with the upper edges of the described parts abutting the curved mounting plate being configured in conformity with the arcuate surface of such plate to assure not only a firm interconnection between the wheel and axle assembly and the end of the tank thereabove but also present structurally sound joints permitting the mobile tank unit to be pulled over relatively rough ground without likelihood of breakdown or failure of the components; to the provision of a mobile tank unit having a relatively low center of gravity wherein such lowering of the center of gravity is accomplished at a nominal cost and without expensive machined parts and the like being necessary; to the provision of a tank unit wherein the fifth wheel mounting structure serving to lower the center of gravity of the tank is disposed so as to not detract from the overall appearance of the tank unit; and to other objects and important advantages of the instant invention which will become obvious or be explained more fully as the following specification progresses.

In the drawing:

Figure 1 is a side elevational view of a mobile tank unit incorporating the improved fifth wheel mounting structure of the present invention, with certain parts being broken away and in section to reveal details of construction;

Fig. 2 is an enlarged, front elevational view of the tank unit illustrated in Fig. 1, with certain parts likewise being broken away to reveal the internal construction of such parts;

Fig. 3 is an enlarged, horizontal, cross-sectional view taken substantially on the line 3—3 of Fig. 1 and looking downwardly in the direction of the arrows; and Fig. 4 is a vertical, cross-sectional view taken substantially on the line 4—4 of Fig. 3.

Briefly, the instant invention includes improved fifth wheel mounting structure for mobile tank units wherein such structure is recessed within the tank directly above the fifth wheel mechanism to thereby cause the center of gravity of the tank to be significantly lowered without impairing steering of the tank unit or rocking movement of the front wheel and axle assembly on a horizontal axis intersecting the vertical axis of rotation of such assembly, and which rocking movement compensates for irregularities in the terrain over which the tank unit is being pulled.

A mobile tank unit broadly designated 10 and incorporating therein improved mounting structure 12 forming the subject matter of the present invention has a cylindrical fuel tank 14 normally supported with the longitudinal axis thereof in a horizontal position by virtue of wheel and axle assemblies 16 and 18 at opposite ends of tank 14. As shown in Fig. 1, tank 14 is preferably divided into two separate compartments by a transverse baffle (not shown) positioned between two fuel inlets 20 and 22. The cylindrical side wall 24 of tank 14 is closed by a circular end wall 26 at the end thereof adjacent wheel and axle assembly 16 and by a circular end wall 28 at the end of tank 14 adjacent wheel and axle assembly 18. Although tank 14 may be of any desired size, it is particularly contemplated that the same be of either 500 gallon or 1000 gallon capacity to thereby adapt unit 10 for use by contractors at the construction site, wherein usual fuel supply facilities are not available. In this connection, it may be noted that if a tank 14 of 1000 gallon capacity is utilized, it is preferred that a pair of elongated channels 30 be provided between wheel and axle assemblies 16 and 18 to reinforce unit 10. Channels 30 are formed of sheet metal and extend between the axles of wheel and axle assemblies 16 and 18 in parallel relationship. A lower, laterally extending flange 31 reinforces each channel 30, while upper, arcuate flanges 33 conforming to the curved outer surface configuration of side wall 24 are welded to the latter. When tank 14 is of 500 gallon capacity, channels 30 ordinarily may be eliminated, since the inherent structural strength of tank 14 is sufficient to resist strains and forces imparted to the unit as the same is pulled over any type of terrain.

Although the axles of each assembly 16 and 18 may be of any suitable construction, it is preferred that the same be relatively tubular as shown in Figs. 2, 3 and 4 with respect to axle 32 of assembly 16, with the wheel shafts 34 of opposed wheels 36 of each assembly 16 and 18 being rotatably mounted on respective shafts 34, the latter in turn being suitably secured within corresponding axles.

A fifth wheel unit generally numerated 38 is mounted on axle 32 intermediate the ends thereof and includes a lower circular bearing plate 40 suitably secured to the upper surface of axle 32 as by welding or the like, and an upper bearing plate 42 of equal diameter to plate 40 and overlying the same in frictional engagement therewith. Bearing plates 40 and 42 have aligned central openings 44 therein receiving an upright, externally threaded bolt 46 joined to axle 32 so as to not rotate with respect thereto, and having a nut 48 complementally threaded on the upper end thereof above the upper surface of bearing plate 42. It can be appreciated that grease is provided between opposed, interengaging surfaces of bearing plates 40 and 42 to permit the same to rotate relatively without excessive friction.

Mounting structure 12 on tank 14 comprises a semi-cylindrical plate 50 recessed within the end portion of tank 14 adjacent end wall 26 and directly above fifth wheel unit 38, as best shown in Figs. 1 and 4. Cylindrical side wall 24 of tank 14 is provided with an opening 52 receiving semicylindrical plate 50 in a recessed position within tank 14. Plate 50 is disposed with its concave surface facing downwardly and opposed edges parallel with the longitudinal axis of tank 14 and in turn the axis of plate 50 being welded to corresponding longitudinal edges 54 of side wall 24. End wall 26 is provided with a semicircular cutout presenting a circular edge 56 conforming to the configuration of plate 50, with edge 56 disposed in abutting relationship with the upper convex surface of plate 50 and suitably joined thereto as by welding or the like. An inner plate member 58 suitably interconnecting the innermost arcuate margin of plate 50 with the proximal edge of opening 52 in side wall 24 serves to close tank 14 and thereby present a recess within the end thereof above assembly 16 and defined by mounting plate 50.

Mounting plate 50 is wide enough along the longitudinal axis thereof to accommodate a pair of irregular terrain compensation components broadly designated 60 and including identical polygonal, upright parts 62 disposed on opposite sides of bolt 46 and welded to the upper face of bearing plate 42. Parts 62 are parallel with front axle 32 of assembly 16 and are pivotally connected to respective upper parts 64 joined to the lower concave surface of plate 50 and depending therefrom. An elongated pin 66 extends through overlapped portions of each of the parts 62 and 64 of respective components 60 and is telescoped within a spacer sleeve 67 between parts 64. Cotter pins through each outer end of pin 66 serve to retain the same in pivotally joining relationship to parts 62 and 64 permitting fifth wheel unit 38 and thereby, wheel and axle assembly 16, to rotate about the axis of pin 66. As illustrated in Fig. 2, the uppermost margins of parts 64 of each of the components 60 are configured in conformity with the curved surface of the lower face of plate 50 and joined thereto by welding to assure firm interconnection of each of the parts 64 with mounting plate 50.

In order to limit swinging movement of wheel and axle assembly 16 about the horizontal axis defined by pin 66, stops 68 are provided on each of the components 60 and preferably on the lower parts 62 thereof to limit rotation of corresponding parts 64 relative to parts 62.

Similarly, an arcuate stop 70 is secured to the outer peripheral margin of upper bearing plate 42 to the rear of front axle 32 to prevent rotation of the latter in either direction beyond a preselected point. It can be appreciated that the outer opposed edges 72 of stop 70 alternately engage front axle 32 to preclude rotation of bearing plate 42 with respect to bearing plate 40 beyond predetermined points.

In order to facilitate towing of mobile tank unit 10, an elongated tongue 74 is pivotally mounted on an extension 76 in turn welded to box frame axle 32.

From the foregoing description, it is apparent that simple and efficient mounting structure has been provided for the fifth wheel unit 38 of mobile tank unit 10 permitting wheel and axle assembly 16 to rotate about vertical and horizontal intersecting axes, yet positioned so as to lower the center of gravity of tank 14 to a level where the normally lowermost portion of cylindrical side wall 24 lies in close proximity to a horizontal plane through the uppermost faces of the axles of assemblies 16 and 18. Furthermore, such lowering of the center of gravity of tank 14 is accomplished without deleteriously affecting the structural strength characteristics of the interconnection between the forward end of tank 14 and wheel and axle assembly 16 and in fact, the inherent strength of unit 10 is actually increased because of the configuration of mounting plate 50 and the way in which upper parts 64 of each of the components 60 are joined to plate 50. Not only does the arcuate edge 56 of end wall 26 serve to reinforce mounting plate 50, but end plate member 58 interconnecting plate 50 and side wall 24 of tank 14 operates to impart great strength to the interconnection between the forward end of tank 14 and fifth wheel unit 38.

Another feature of the instant mounting structure is the fact that the forward part of the recess defined by mounting plate 50 and plate member 58 is opened at the front thereof to permit ready access to components 60 and fifth wheel unit 38 for servicing of the same as necessary. No close tolerance, highly machined parts are necessary in construction of mounting structure 12 and therefore, unit 10 may be constructed at a minimum cost and presents a fuel carrier adapted for utilization on all types of ground, regardless of the irregularity thereof. The low center of gravity of tank 14 substantially precludes the possibility of the same overturning when unit 10 is towed over rough ground.

Having thus described the invention what is claimed as new and desired to be secured by Letters Patent is:

1. In an elongated tank of cylindrical configuration, having a substantially uniform diameter throughout the longitudinal length thereof, and supported by wheel and axle assemblies at each end thereof with the axis thereof in a horizontal position, said tank being provided with components between one of the axles and the end portion of the tank thereabove, said components including a fifth wheel unit mounted on said one axle and permitting the latter to rotate about a substantially vertical axis and a pair of upright, pivotally interconnected parts carried by the unit thereabove permitting said one axle to rock about a substantially horizontal axis intersecting said vertical axis, the combination with said tank and components of an arcuate plate joined to and recessed within said end portion of the tank above said components and having the upper of said parts secured thereto at an area remote from the lowermost portion of the tank, said plate having an axis of revolution substantially parallel with the horizontal axis of rocking movement of said one axle, said area being sufficiently spaced inwardly from said portion of the tank a sufficient distance only to cause the latter to lie in close proximity to a plane through the upper surfaces of said axles.

2. In a mobile carrier including a horizontally disposed cylindrical tank of substantially uniform diameter throughout the length thereof and supported by wheel and axle assemblies at each end thereof and provided with components between one of the axles and the end portion of the tank thereabove, said components including a fifth wheel unit permitting said one axle to rotate about a substantially vertical axis and a pair of upright, pivotally interconnected parts carried by the unit thereabove permitting said one axle to rock about a substantially horizontal axis intersecting said vertical axis, the combination with said tank and components of a semicylindrical plate joined to and recessed within said end portion of the tank above said components, said plate being disposed with the concave surface thereof facing downwardly and having an axis of revolution substantially parallel with the horizontal axis of rocking movement of said one axle, the upper of said parts secured to the innermost exterior area of the plate, said area being sufficiently remote from the lowermost portion of the tank to cause the latter to lie in close proximity to a plane through the upper surfaces of said axles.

3. The combination as set forth in claim 2 wherein said tank has a cylindrical side wall and the axes of the plate and said side wall are disposed in parallelism with the outer edges of the plate parallel with said axes being joined to said side wall.

4. The combination as set forth in claim 3 wherein said tank has circular end walls closing each end thereof, one arcuate edge of said plate extending into abutting relationship with and joined to the end wall of the tank at the end thereof above said one axle, and wherein is provided a reinforcing member joining the opposite arcuate edge of the plate to a proximal segment of the side wall of said tank.

5. In mounting structure for a mobile cylindrical tank of the type supported by wheel and axle assemblies at each end thereof and provided with a fifth wheel unit mounted on one of the axles between said one axle and the tank, the improvement of which comprises a semicylindrical plate adapted to be joined to and recessed within said tank at the end thereof overlying said one axle and with the concave surface of said plate facing downwardly, said plate having an horizontal axis of revolution substantially parallel with the longitudinal axis of said tank; a first upright element secured to the uppermost face of said unit; and a second upright element pivotally connected to said first element for rotation on a substantially horizontal axis intersecting said vertical axis, said second element extending upwardly into said plate and joined to the innermost area thereof, the upper edge of said second element abutting and joined to the plate being complementally configured with said surface.

References Cited in the file of this patent

UNITED STATES PATENTS

| | | |
|---|---|---|
| 1,079,475 | Davis | Nov. 25, 1913 |
| 2,032,568 | Fogh | Mar. 3, 1936 |
| 2,432,253 | Schaeffer | Dec. 9, 1947 |
| 2,724,597 | Fowler | Nov. 22, 1955 |

FOREIGN PATENTS

| 6,013 | Norway | Jan. 31, 1898 |